(12) United States Patent
Higuchi et al.

(10) Patent No.: US 10,529,978 B2
(45) Date of Patent: Jan. 7, 2020

(54) NONAQUEOUS ELECTROLYTE SECONDARY BATTERY

(71) Applicant: Sanyo Electric Co., Ltd., Daito-shi, Osaka (JP)

(72) Inventors: Takatoshi Higuchi, Hyogo (JP); Atsushi Fukui, Hyogo (JP); Takahiro Isono, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 196 days.

(21) Appl. No.: 15/554,982

(22) PCT Filed: Mar. 8, 2016

(86) PCT No.: PCT/JP2016/001243
§ 371 (c)(1),
(2) Date: Aug. 31, 2017

(87) PCT Pub. No.: WO2016/157735
PCT Pub. Date: Oct. 6, 2016

(65) Prior Publication Data
US 2018/0108939 A1    Apr. 19, 2018

(30) Foreign Application Priority Data

Mar. 30, 2015   (JP) ................................ 2015-069705

(51) Int. Cl.

| | |
|---|---|
| *H01M 4/133* | (2010.01) |
| *H01M 4/62* | (2006.01) |
| *H01M 4/58* | (2010.01) |
| *H01M 4/36* | (2006.01) |
| *H01M 4/587* | (2010.01) |
| *H01M 10/0525* | (2010.01) |
| *H01M 10/058* | (2010.01) |
| *H01M 4/583* | (2010.01) |
| *H01M 4/66* | (2006.01) |
| *C01B 25/30* | (2006.01) |
| *C01G 41/02* | (2006.01) |
| *H01M 4/02* | (2006.01) |

(52) U.S. Cl.
CPC ........... *H01M 4/133* (2013.01); *H01M 4/366* (2013.01); *H01M 4/583* (2013.01); *H01M 4/587* (2013.01); *H01M 4/5825* (2013.01); *H01M 4/62* (2013.01); *H01M 4/622* (2013.01); *H01M 4/625* (2013.01); *H01M 4/661* (2013.01); *H01M 10/058* (2013.01); *H01M 10/0525* (2013.01); *C01B 25/30* (2013.01); *C01G 41/02* (2013.01); *H01M 2004/027* (2013.01); *H01M 2004/028* (2013.01); *H01M 2220/20* (2013.01); *Y02T 10/7011* (2013.01)

(58) Field of Classification Search
CPC ...... H01M 4/587; H01M 4/583; H01M 4/133; H01M 4/62; H01M 4/622; H01M 4/366; H01M 4/625; H01M 4/5825; H01M 10/0525; H01M 10/058; H01M 2004/027; H01M 2004/028; H01M 2220/20; Y02T 10/7011
See application file for complete search history.

(56) References Cited

U.S. PATENT DOCUMENTS

| | | | |
|---|---|---|---|
| 2008/0003503 A1* | 1/2008 | Kawakami | ............ H01M 4/485 429/231.5 |
| 2008/0081263 A1 | 4/2008 | Saisho et al. | |
| 2011/0217598 A1 | 9/2011 | Kawashima et al. | |
| 2012/0034503 A1* | 2/2012 | Toyama | ................ H01M 4/366 429/91 |
| 2018/0040885 A1* | 2/2018 | Tuduki | .................... H01M 4/36 |

FOREIGN PATENT DOCUMENTS

| | | |
|---|---|---|
| CN | 101154755 A | 4/2008 |
| CN | 102195088 A | 9/2011 |
| JP | 2003-346804 A | 12/2003 |
| JP | 2010-40383 A | 2/2010 |
| JP | 2012-38534 A | 2/2012 |
| WO | 2014-128903 A1 | 8/2014 |

OTHER PUBLICATIONS

English Translation of Search Report dated Jan. 25, 2019, issued in counterpart CN Application No. 201680013543.4 (2 pages).
International Search Report dated Jun. 14, 2016, issued in counterpart International Application No. PCT/JP2016/001243 (1 page).

* cited by examiner

*Primary Examiner* — Laura Weiner

(57) ABSTRACT

It is an object of the present invention to provide a nonaqueous electrolyte secondary battery improved in output after storage in a charged state. An embodiment of the present invention provides a nonaqueous electrolyte secondary battery including an electrode assembly having a structure in which a positive plate and a negative plate are stacked with a separator therebetween. The positive plate contains tungsten and a phosphate compound. The negative plate contains a graphitic carbon material as a negative electrode active material and a noncrystalline carbon material stuck on the surface thereof. The negative plate contains tungsten or a tungsten compound on the surface of the noncrystalline carbon material.

4 Claims, No Drawings

NONAQUEOUS ELECTROLYTE SECONDARY BATTERY

TECHNICAL FIELD

The present invention relates to a nonaqueous electrolyte secondary battery.

BACKGROUND ART

Nonaqueous electrolyte secondary batteries are required to have further enhanced output characteristics and durability mainly for applications for motor power supplies for electric vehicles (EVs), hybrid electric vehicles (HEVs), electric tools, and the like.

Patent Literature 1 describes a technique for enhancing safety during overcharge using a positive electrode in which the surface of a positive electrode active material is coated with W, Mo, a Zr compound, and a phosphate compound.

Patent Literature 2 describes a technique for enhancing load characteristics by sticking carbon black to the surface of graphite as a conductive agent.

CITATION LIST

Patent Literature

PTL 1: International Publication Mo. WO 2014-128903
PTL 2: Japanese Published Unexamined Patent Application No. 2003-346804

SUMMARY OF INVENTION

Technical Problem

However, in the above conventional techniques, durability is not sufficiently investigated and, in particular, there is a problem in that the output after storage in a charged state is insufficient.

It is an object of the present invention to provide a nonaqueous electrolyte secondary battery more improved in output after storage in a charged state than ever before.

Solution to Problem

The present invention provides a nonaqueous electrolyte secondary battery including an electrode assembly having a structure in which a positive plate and a negative plate are stacked with a separator therebetween. The positive plate contains tungsten and a phosphate compound. The negative plate contains a graphitic carbon material as a negative electrode active material and a noncrystalline carbon material stuck on the surface thereof and also contains tungsten or a tungsten compound on the surface of the noncrystalline carbon material.

The inventors have performed intensive investigations and, as a result, have found that in the case of using a graphitic carbon material as a negative electrode active material and a noncrystalline carbon material stuck on the surface thereof, the reaction resistance of the interface between an active material and an electrolyte solution is reduced and the output after storage in a charged state is significantly improved in such a manner that a coating of tungsten or a tungsten compound is uniformly formed on the surface of the noncrystalline carbon material. That is, when tungsten is contained in a positive plate, these are dissolved during charge, migrate to a negative electrode, and are precipitated on a surface of the negative electrode. The dissolution and precipitation thereof allow fine, uniform tungsten or the tungsten compound to be precipitated on the noncrystalline carbon material on the surface of the negative electrode active material, whereby a coating is formed. In this course, when a phosphate compound is present in a positive electrode containing tungsten, the decomposition reaction rate of tungsten in the positive electrode is varied by the catalysis of the phosphate compound and a coating containing tungsten or the tungsten compound is efficiently formed on the surface of the noncrystalline carbon material. When the phosphate compound is not present in the positive electrode, the amount of dissolved tungsten is relatively small. Therefore, a nonuniform coating is formed on the surface of the noncrystalline carbon material to increase the reaction resistance.

In an embodiment of the present invention, the phosphate compound is lithium phosphate.

In another embodiment of the present invention, the positive plate contains at least one of tungsten in a positive electrode active material and a tungsten compound in a positive electrode mix layer.

In another embodiment of the present invention, the tungsten compound is $WO_3$.

In another embodiment of the present invention, the noncrystalline carbon material is carbon black.

Advantageous Effects of Invention

According to the present invention, the output after storage in a charged state can be more improved than ever before.

DESCRIPTION OF EMBODIMENTS

Embodiments of the present invention are described below.

A nonaqueous electrolyte secondary battery according to this embodiment has a basic configuration similar to a conventional one and includes a wound electrode assembly in which a positive plate and a negative plate are wound with a separator therebetween. The outermost peripheral surface of the wound electrode assembly is covered by the separator.

The positive plate includes a positive core made of aluminum or an aluminum alloy and positive electrode mix layers that are placed on both surfaces of the positive core such that positive core-exposed portions where the core is narrowly exposed at one of lateral ends along a longitudinal direction are located on both surfaces thereof.

The negative plate includes a negative core made of copper or a copper and negative electrode mix layers that are placed on both surfaces of the negative core such that negative core-exposed portions where the core is narrowly exposed at one of lateral ends along a longitudinal direction are located on both surfaces thereof.

The wound electrode assembly is flat and is prepared in such a manner that the positive plate and the negative plate are wound with the separator therebetween and are formed into a flat shape. In this operation, the wound positive core-exposed portions are formed at one of ends of the wound electrode assembly, which is flat, and the wound negative core-exposed portions are formed at the other end.

The wound positive core-exposed portions are electrically connected to a positive electrode terminal through a positive electrode current collector. On the other hand, the wound negative core-exposed portions are electrically connected to a negative electrode terminal through a negative electrode current collector. The positive electrode current collector and the positive electrode terminal are preferably made of aluminum or an aluminum alloy. The negative electrode current collector and the negative electrode terminal are preferably made of copper or a copper alloy. The positive electrode terminal is fixed to a sealing body through an insulating member. The negative plate is also fixed to the sealing body through the insulating member.

The wound electrode assembly, which is flat, is housed in a prismatic enclosure in such a state that the wound electrode assembly is covered by an insulating sheet made of resin. The sealing body is brought into contact with an opening of the prismatic enclosure, which is made of metal, and a contact between the sealing body and the prismatic enclosure is laser-welded.

The sealing body has an electrolyte solution inlet. A nonaqueous electrolyte solution is poured from the electrolyte solution inlet. Thereafter, the electrolyte solution inlet is sealed with a blind rivet or the like. Of course, the nonaqueous electrolyte secondary battery is an example, may have another configuration, and may be, for example, a laminate-type nonaqueous electrolyte secondary battery formed by putting the nonaqueous electrolyte solution and the wound electrode assembly in a laminate enclosure.

Next, a positive electrode, a negative electrode, the separator, and a nonaqueous electrolyte in this embodiment are described.

<Positive Electrode>

The positive electrode is composed of, for example, the positive electrode current collector, such as metal foil, and the positive electrode mix layers formed on the positive electrode current collector. The positive electrode current collector used may be foil of a metal, such as aluminum, stable in the potential range of the positive electrode; a film including a surface layer containing the metal; or the like. The positive electrode mix layers contain a lithium transition metal oxide which is a positive electrode active material and a phosphate compound and preferably further contain a conductive agent and a binding agent. The positive electrode can be prepared in such a manner that, for example, positive electrode mix slurry containing the positive electrode active material, the binding agent, and the like is applied to the positive electrode current collector; wet coatings are dried and are then rolled; and the positive electrode mix layers are thereby formed on both surfaces of the current collector.

The positive electrode active material used is one containing a lithium transition metal oxide. The positive electrode mix layers contain the phosphate compound ($Li_3PO_4$ or the like). The lithium transition metal oxide preferably contains tungsten. The positive electrode mix layers preferably contain a tungsten compound. It is more preferable that the lithium transition metal oxide contains tungsten and the positive electrode mix layers contain the tungsten compound.

The lithium transition metal oxide is preferably an oxide represented by the formula $Li_{1+x}M_aO_{2+b}$ (where $x+a=1$, $-0.2<x\leq0.2$, $-0.1\leq b\leq0.1$, and M includes at least one metal element selected from the group consisting of Ni, Co, Mn, and Al). Furthermore, M is preferably at least Ni. The lithium transition metal oxide preferably contains cobalt (Co) and manganese (Mn) in addition to Ni. The lithium transition metal oxide preferably contains aluminum (Al) instead of Mn in addition to Ni, Co, and Mn.

The proportion of Ni in above M is preferably 30% by mole or more. Ni is preferably contained in the form of $Ni^{3+}$. An example of a $Ni^{3+}$-containing lithium transition metal oxide is a lithium nickel-cobalt-manganate in which the molar ratio is Ni>Mn, that is, the molar ratio of Ni to Co to Mn is, for example, 3:5:2, 4:3:3, 5:2:3, 5:3:2, 6:2:2, 7:1:2, 7:2:1, or 8:1:1. In a lithium nickel-cobalt-aluminate, the molar ratio of Ni to Co to Al is, for example, 80:15:5, 85:12:3, or 90:7:3.

The following elements can be exemplified as elements other than Ni, Co, and Mn: transition metal elements such as zirconium (Zr), alkali metal elements, alkaline-earth metal elements, group 12 to 14 elements, and the like. In particular, the following elements can be exemplified: boron (B), magnesium (Mg), aluminum (Al), titanium (Ti), chromium (Cr), iron (Fe), copper (Cu), zinc (Zn), niobium (Kb), molybdenum (Mo), tantalum (Ta), tin (Sn), sodium (Na), potassium (K), barium (Ba), strontium (Sr), calcium (Ca), and the like. Zr has, for example, the function of stabilizing the crystal structure of the lithium transition metal oxide.

The positive electrode active material is in the form of, for example, secondary particles (not separated into any primary particles by ultrasonic dispersion or the like) formed by the aggregation of primary particles. The particle size of the lithium transition metal oxide is not particularly limited. The volume-average particle size thereof is preferably 0.1 µm to 20 µm as determined by laser diffractometry. When the particle size of the lithium transition metal oxide is within this range, the good ionic conductivity and electronic conductivity of the positive electrode mix layers are likely to be both achieved. From the viewpoint of the retentivity and diffusivity of an electrolyte solution, the lithium transition metal oxide preferably has a large specific surface area as determined by a BET method.

The content of W in the lithium transition metal oxide is preferably 0.05% by mole to 10% by mole with respect to metal elements, excluding Li, in the lithium transition metal oxide, more preferably 0.1% by mole to 5% by mole, and particularly preferably 0.2% by mole to 3% by mole.

W can be contained in the oxide in such a manner that in the synthesis of the lithium transition metal oxide, for example, a composite oxide containing Ni, Co, Mn, and the like; a lithium compound such as lithium hydroxide; and W or a tungsten compound such as a tungsten oxide are mixed together, followed by firing. W is preferably present in the lithium transition metal oxide in the form of a solid solution. A solid solution of W can be formed in the lithium transition metal oxide in such a manner that in the synthesis of the lithium transition metal oxide, a composite oxide containing Ni, Co, Mn, and the like and W are mixed together, followed by firing. W may be precipitated at interfaces between primary particles or on the surfaces of secondary particles in the form of an oxide or metal.

The content of each of the phosphate compound and tungsten oxide in the positive electrode mix layers is preferably 0.01% by weight to 5% by weight with respect to the total weight of the positive electrode active material, more preferably 0.05% by weight to 4% by weight, and particularly preferably 0.1% by weight to 3% by weight. The particle size of each of the phosphate compound and the tungsten oxide is preferably less than the particle size of the positive electrode active material and is, for example, 25% or less of the average particle size of the positive electrode active material.

The phosphate compound, which is mixed in the positive electrode active material layers, is at least one selected from the group consisting of, for example, lithium phosphate, lithium dihydrogen phosphate, cobalt phosphate, nickel phosphate, manganese phosphate, potassium phosphate, and ammonium dihydrogen phosphate. Among these, lithium phosphate is particularly preferably used. The tungsten compound, which is mixed in the positive electrode active material layers, is not particularly limited; is preferably a tungsten oxide; and is preferably $WO_3$, which is most stable and in which the oxidation number of tungsten is 6.

The phosphate compound and the tungsten oxide can be attached to the surfaces of particles of the active material in such a manner that, for example, the phosphate compound and the tungsten oxide are mechanically mixed with the positive electrode active material. Alternatively, the phosphate compound and the tungsten oxide may be mixed in the positive electrode mix layers in such a manner that the phosphate compound and the tungsten oxide are added in a step of preparing positive electrode mix slurry by kneading the conductive agent and the binding agent. The phosphate compound and the tungsten oxide are preferably added to the positive electrode mix layers by the former method. This efficiently allows the phosphate compound and the tungsten oxide to be present near the surfaces of the active material particles.

The presence of the phosphate compound in the positive electrode mix layers enables the reaction rate of dissolving a portion of tungsten to be adjusted, thereby forming a surface coating on the negative electrode in a good form.

The conductive agent is used to increase the electrical conductivity of the positive electrode mix layers. Examples of the conductive agent include carbon materials such as carbon black, acetylene black, Ketjenblack, and graphite. These may be used alone or in combination.

The binding agent is used to maintain the good contact between the positive electrode active material and the conductive agent and to increase the adhesion of the positive electrode active material and the like to a surface of the positive electrode current collector. Examples of the binding agent include fluorinated resins such as polytetrafluoroethylene (PTFE) and polyvinylidene fluoride (PVdF), polyacrylonitrile (PAM), polyimide resins, acrylic resins, and polyolefin resins. These resins may be used in combination with carboxymethylcellulose (CMC), a salt thereof (that may be CMC—Na, CMC—K, CMC—$NH_4$, a partially neutralized salt, or the like), polyethylene oxide (PEO), and/or the like. These may be used alone or in combination.

<Negative Electrode>

The negative electrode is composed of, for example, the negative electrode current collector made of metal foil or the like and the negative electrode mix layers formed on the current collector. The negative electrode current collector used may be foil of a metal, such as copper, stable in the potential range of the negative electrode; a film including a surface layer containing the metal; or the like. The negative electrode mix layers preferably contain a negative electrode active material and a binding agent. The negative electrode can be prepared in such a manner that, for example, negative electrode mix slurry containing the negative electrode active material, the binding agent, and the like is applied to the negative electrode current collector; wet coatings are dried and are then rolled; and the negative electrode mix layers are thereby formed on both surfaces of the current collector.

The negative electrode active material contains a graphitic carbon material, such as natural graphite or synthetic graphite, capable of reversibly storing and releasing lithium ions and a noncrystalline carbon material.

The term "graphitic carbon material" refers to a carbon material with a developed graphite crystal structure and includes natural graphite, synthetic graphite, and the like. These may be flaky or may have been spheroidized. Synthetic graphite is prepared in such a manner that a raw material such as petroleum, coal pitch, or coke is heat-treated at 2,000° C. to 3,000° C. or higher in an Acheson furnace, a graphite heater, or the like. The d(002) interplanar spacing determined by X-ray diffraction is preferably 0.338 nm or less. The crystal thickness (Lc (002)) in the c-axis direction is preferably 30 nm to 1,000 nm.

The term "noncrystalline carbon material" as used herein refers to a carbon material with an undeveloped graphite crystal structure and amorphous or microcrystalline carbon with a turbostratic structure and particularly means that the d(002) interplanar spacing determined by X-ray diffraction is 0.342 nm or more. Hard carbon (non-graphitizable carbon), soft carbon (graphitizable carbon), carbon black, carbon fibers, activated carbon, and the like are cited. Methods for producing these are not particularly limited. These are obtained by carbonizing, for example, resins or resin compositions. The following materials can be used: phenolic thermosetting resins, thermoplastic resins such as polyacrylonitrile, petroleum or coal tar, petroleum or coal pitch, and the like. For example, carbon black is obtained by pyrolyzing a hydrocarbon serving as a raw material. Pyrolysis processes include thermal processes, acetylene decomposition processes, and the like. Incomplete combustion processes include contact processes, lamp black processes, gas furnace processes, oil furnace processes, and the like. Examples of carbon black produced by these processes include, for example, acetylene black, Ketjenblack, thermal black, and furnace black. These noncrystalline carbon materials may be surface-coated with different noncrystalline or amorphous carbon.

The noncrystalline carbon material is preferably present in such a state that the noncrystalline carbon material is stuck on the surface of the graphitic carbon material. The term "stuck" as used herein refers to a chemically or physically bonded state and means that the graphitic carbon material and the noncrystalline carbon material are not separated from each other even if the negative electrode active material of the present invention is stirred in water or an organic solvent.

A coating with low reaction overvoltage is formed on the surface of the noncrystalline carbon material by sticking the noncrystalline carbon material, which has a larger reaction area as compared to graphitic carbon and a multi-orientational microstructure, to the surface of the graphitic carbon material; hence, the reaction overvoltage of the whole graphitic carbon material with respect to the intercalation/deintercalation of Li decreases. Furthermore, the noncrystalline carbon material has a nobler reaction potential as compared to the graphitic carbon material and therefore reacts preferentially with tungsten dissolved from the positive electrode, so that a good coating with more excellent lithium ion permeability is formed on the surface of the noncrystalline carbon material; hence, the reaction overvoltage of the whole graphitic carbon material with respect to the intercalation/deintercalation of Li further decreases. A coating containing tungsten dissolved from the positive electrode may be a mixture or deposit of oxidative degradation products of the electrolyte solution.

The ratio between the graphitic carbon material and the noncrystalline carbon material is not particularly limited. The proportion of the noncrystalline carbon material, which is excellent in Li storage performance, is preferably high. The proportion of the noncrystalline carbon material in the active material is preferably 0.5% by weight or more and more preferably 2% by weight or more. However, when the noncrystalline carbon material is excessive, the noncrystalline carbon material cannot be evenly stuck to the surface of graphite. Therefore, the upper limit is preferably determined in consideration of this.

Examples of a method for sticking the noncrystalline carbon material to the graphitic carbon material include a method in which petroleum or coal tar or pitch is added to the noncrystalline carbon material, followed by mixing with the graphitic carbon material and heat treatment; a mechanofusion method in which graphite particles are coated with solid noncrystalline carbon by applying compressive shear stress between the graphite particles and solid noncrystalline carbon; a solid-phase method in which coating is performed by a sputtering process; and a liquid-phase method in which graphite is immersed in a solution prepared by dissolving in noncrystalline carbon in a solvent such as toluene, followed by heat treatment.

The primary particle size of noncrystalline carbon is preferably small from the viewpoint of the diffusion length of Li. The specific surface area thereof is preferably large because the reaction surface area for the intercalation of Li is large. However, an excessively large specific surface area causes an excessive surface reaction, leading to an increase in resistance, Therefore, the specific surface area of noncrystalline carbon is preferably 5 $m^2/g$ to 200 $m^2/q$. In order to reduce the excessive specific surface area, the primary particle size thereof is preferably 20 nm to 1,000 nm and more preferably 40 nm to 100 nm. The noncrystalline carbon material preferably has no hollow structure in which a hollow is present in particles.

As is the case with the positive electrode, the binding agent used may be a fluorinated resin, PAN, a polyimide resin, an acrylic resin, a polyolefin resin, or the like. In the case of using an aqueous solvent to prepare the negative electrode mix slurry, the following material is preferably used: styrene-butadiene rubber (SBR), CMC, a salt thereof, polyacrylic acid (PAA), a salt thereof (that may be PAA-Na, PAA-K, or a partially neutralized salt), polyvinyl alcohol (PVA), or the like.

<Separator>

The separator used is a porous sheet having ionic permeability and insulation properties. Examples of the porous sheet include microporous thin films, fabrics, and nonwoven fabrics. The separator is preferably made of an olefin resin such as polyethylene or polypropylene or cellulose. The separator may be a laminate including a cellulose fiber layer and a thermoplastic resin fiber layer made of the olefin resin or the like.

<Nonaqueous Electrolyte>

An electrolyte is a nonaqueous electrolyte containing, for example, a nonaqueous solvent and an electrolyte salt dissolved in the nonaqueous solvent. The nonaqueous electrolyte is not limited to any liquid electrolyte (nonaqueous electrolyte solution) and may be a solid electrolyte containing a gel-like polymer. The following solvents can be used for the nonaqueous solvent: for example, esters, ethers, nitriles, amides such as dimethylformamide, and mixtures of two or more of these solvents. A sulfo group-containing compound, such as propanesultone may be used. The nonaqueous solvent may contain a halogen-substituted compound obtained by substituting hydrogen in at least one of these solvents with an atom of a halogen such as fluorine.

Linear carboxylates can be exemplified as the esters. The linear carboxylates are not particularly limited and are preferably linear carboxylates containing three to five carbon atoms. Examples thereof include methyl propionate, ethyl propionate, methyl acetate, ethyl acetate, and propyl acetate.

Examples of the esters (other than the linear carboxylates) include cyclic carbonates such as ethylene carbonate (EC), propylene carbonate (PC), butylene carbonate, and vinylene carbonate (VC); linear carbonates such as dimethyl carbonate (DMC), ethyl methyl carbonate (EMC), diethyl carbonate (DEC), methyl propyl carbonate, ethyl propyl carbonate, and methyl isopropyl carbonate; and cyclic carboxylates such as γ-butyrolactone (GBL) and γ-valerolactone (GVL).

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybensene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

Examples of the halogen-substituted compound include fluorinated cyclic carbonates such as fluoroethylene carbonate (EEC), fluorinated linear carbonates, and fluorinated linear carboxylates such as methyl fluoropropionate (FMP).

The electrolyte salt is preferably a lithium salt. Examples of the lithium salt include $LiBF_4$; $LiClO_4$; $LiPF_6$; $LiAsF_6$; $LiSbF_6$; $LiAlCl_4$; $LiSCN$; $LiCF_3SO_3$; $LiC(C_2F_5SO_2)$; $LiCF_3CO_2$; $Li(P(C_2O_4)F_4)$; $Li(P(C_2O_4)F_2)$; $LiPF_{6-x}$ $CnF_{2n+1})_x$ (where 1<x<6 and n is 1 or 2); $LiB_{10}Cl_{10}$; LiCl; LiBr; LiI; chloroborane lithium; lithium lower aliphatic carboxylates; borates such as $Li_2B_4O_7$, $Li(B(C_2O_4)_2)$ [lithium-bisoxalate borate (LiBOB)], and $Li(B(C_2O_4)F_2)$; and imide salts such as $LiN(FSO_2)_2$ and $LiN(C_1F_{21+1}SO_2)$ $(C_mF_{2m+1}SO_2)$ {where 1 and m are integers greater than or equal to 1}. The lithium salt used may be one of these salts or a mixture of some of these salts. Among these salts, at least one fluorine-containing lithium salt is preferably used from the viewpoint of ionic conductivity, electrochemical stability, and the like. For example, $LiPF_6$ is preferably used. In particular, from the viewpoint that a coating stable in a high-temperature environment is formed on a surface of the negative electrode, the fluorine-containing lithium salt and a lithium salt containing oxalato complex anions (for example, LiBOB) are preferably used in combination. The concentration of the lithium salt is preferably 0.8 mol to 1.8 mol per liter of the nonaqueous solvent and more preferably 1.2 mol to 1.5 mol in order to achieve high output.

A portion of tungsten contained in the positive electrode active material is dissolved during the charge of the nonaqueous electrolyte secondary battery, migrates to the negative electrode, and is precipitated on a surface of the negative electrode. Through the dissolution and precipitation, tungsten or the tungsten compound is finely and uniformly precipitated on the surface of the negative electrode active material, particularly on the noncrystalline carbon material in the negative electrode active material surface. In this sense, it can be said that the negative electrode contains the graphitic carbon material, the noncrystalline carbon material, and tungsten or the tungsten compound.

In this embodiment, since tungsten and the phosphate compound are present in the positive electrode as described above, the decomposition reaction rate of tungsten in the positive electrode is varied by the catalysis of the phosphate compound. Therefore, when an appropriate amount of tungsten is dissolved from the positive electrode to a surface of the negative electrode and the electrolyte solution and lithium ions are decomposed on the negative electrode to form a surface coating, a good surface coating containing tungsten or the tungsten compound is formed and the reaction resistance of an active material-electrolyte solution interface is reduced, thereby enabling high output characteristics to be maintained even after storage in a charged state.

When the noncrystalline carbon material is not present in the negative electrode active material, any good coating is not formed on the negative electrode active material because of the absence of the noncrystalline carbon material or the effect of reducing the reaction resistance is not obtained, though there is the effect of dissolving tungsten by the phosphate compound. Incidentally, it is known that coating the surfaces of graphite particles with the noncrystalline carbon material increases the number of reaction sites capable of storing and releasing lithium ions and therefore the charge acceptance of the graphite particles is enhanced.

When the phosphate compound is not present in the positive electrode mix layers, the amount of dissolved tungsten is small because of the absence of a substance acting as a catalyst, tungsten is not evenly dispersed on the noncrystalline carbon material, a nonuniform coating is formed, and therefore the reaction resistance increases.

Next, examples are described.

Example 1

Experiment Example 1

[Preparation of Positive Electrode Active Material]

A nickel-cobalt-manganese composite oxide was prepared by firing a nickel-cobalt-manganese composite hydroxide that was obtained in such a manner that $NiSO_4$, $CoSO_4$, and $MnSO_4$ were mixed in an aqueous solution and were co-precipitated. Next, the composite oxide, lithium hydroxide, and tungsten oxide ($WO_3$) were mixed using a Raikai mortar such that the molar ratio of lithium to a combination of nickel, cobalt, and manganese that were all transition metals to tungsten was 1.15:1:0.005. The mixture was fired in air, followed by grinding, whereby a tungsten-containing lithium transition metal oxide (positive electrode active material) was obtained. The obtained positive electrode active material was subjected to elemental analysis by ICP, resulting in that the molar ratio of each element to the whole transition metals was Ni:Co:Mn:W=47:27:26:0.5.

[Preparation of Positive Electrode]

The positive electrode active material, $WO_3$, and $Li_3PO_4$ were mixed together, the amount of $WO_3$ being 0.5% by weight of the active material, the amount of $Li_3PO_4$ being 1% by weight of the active material. The mixture, carbon black, and polyvinylidene fluoride (PVDF) were mixed at a weight ratio of 91:7:2. N-methyl-2-pyrrolidone (NMP) serving as a dispersion medium was added to this mixture, followed by kneading, whereby positive electrode mix slurry was prepared. Next, the positive electrode mix slurry was applied to aluminum foil that was a positive electrode current collector and a wet coating was dried, whereby a positive electrode mix layer was formed on the aluminum foil. The current collector provided with the mix layer was cut into a predetermined size, followed by rolling and attaching an aluminum tab thereto, whereby a positive electrode was obtained.

[Preparation of Negative Electrode]

Natural graphite, pitch, and carbon black were mixed such that the mass ratio of natural graphite to pitch to carbon black was 91:5:4, whereby the surfaces of graphite particles were coated with pitch and carbon black. Next, the obtained mixture was calcined at 1,500° C. for 24 hours in an inert gas atmosphere, followed by crushing and grinding a calcined product, whereby a negative electrode active material was prepared. The prepared negative electrode active material, carboxymethylceilulose (CMC) serving as a thickening agent, and styrene-butadiene rubber (SBR) serving as a binding agent were weighed such that the mass ratio of the negative electrode active material to CMC to SBR was 98:1:1, followed by dispersing these materials in water, whereby negative electrode mix slurry was prepared. The negative electrode mix slurry was applied to a current collector made of copper foil, whereby a negative electrode mix layer was formed. Thereafter, water was removed by drying, the negative electrode mix layer was rolled to a predetermined thickness, the current collector was cut to a predetermined size, and a nickel tab was attached thereto, whereby a negative electrode was prepared.

[Preparation of Nonaqueous Electrolyte Solution]

Ethylene carbonate (EC), ethyl methyl carbonate (EMC), and dimethyl carbonate (DMC) were mixed at a volume ratio of 3:3:3. $LiPF_6$ was dissolved in the solvent mixture at a concentration of 1.2 mol/L, whereby a nonaqueous electrolyte solution was prepared.

[Preparation of Test Cell]

The single positive electrode, the single negative electrode, and a single separator composed of a microporous membrane made of polyethylene were used to prepare a wound electrode assembly. First, the positive electrode and the negative electrode were arranged opposite to each other in such a state that the positive electrode and the negative electrode were insulated from each other with the separator therebetween. Next, the positive electrode, the negative electrode, and the separator were spirally wound using a cylindrical core. In this operation, each of a positive electrode current-collecting tab and a negative electrode current-collecting tab was placed so as to be located on the outermost periphery in a corresponding one of the electrodes. Thereafter, the core was removed, whereby the wound electrode assembly was prepared.

The nonaqueous electrolyte solution and wound electrode assembly prepared as described above were put in a laminate enclosure made of aluminum in a glove box under an argon atmosphere, whereby a laminate-type nonaqueous electrolyte secondary battery, that is. Test Cell A1 was prepared.

Experiment Example 2

Test Cell A2 was prepared in substantially the same manner as that used in Experiment Example 1 except that no $WO_3$ was added in the preparation of a positive electrode.

Experiment Example 3

Test Cell A3 was prepared in substantially the same manner as that used in Experiment Example 1 except that no tungsten oxide was mixed in the preparation of a positive electrode active material.

Experiment Example 4

Test Cell B1 was prepared in substantially the same manner as that used in Experiment Example 1 except that no noncrystalline carbon material was formed in the preparation of a negative electrode.

Experiment Example 5

Test Cell B2 was prepared in substantially the same manner as that used in Experiment Example 1 except that no $Li_3P_4$ was mixed in the preparation of a positive electrode.

Experiment Example 6

Test Cell B3 was prepared in substantially the same manner as that used in Experiment Example 1 except that no $Li_3PO_4$ was mixed in the preparation of a positive electrode or no noncrystalline carbon material was formed in the preparation of a negative electrode.

Experiment Example 7

Test Cell B4 was prepared in substantially the same manner as that used in Experiment Example 2 except that no noncrystalline carbon material was formed in the preparation of a negative electrode.

Experiment Example 8

Test Cell B5 was prepared in substantially the same manner as that used in Experiment Example 3 except that no noncrystalline carbon material was formed in the preparation of a negative electrode.

Experiment Example 9

Test Cell B6 was prepared in substantially the same manner as that used in Experiment Example 3 except that no $Li_3PO_4$ was mixed in the preparation of a positive electrode.

Experiment Example 10

Test Cell B7 was prepared in substantially the same manner as that used in Experiment Example 3 except that no $Li_3PO_4$ was mixed in the preparation of a positive electrode or no noncrystalline carbon material was formed in the preparation of a negative electrode.

Experiment Example 11

Test Cell B8 was prepared in substantially the same manner as that used in Experiment Example 3 except that no $WO_3$ was added in the preparation of a positive electrode.

Experiment Example 12

Test Cell B9 was prepared in substantially the same manner as that used in Experiment Example 3 except that no $WO_3$ or $Li_3PO_4$ was mixed in the preparation of a positive electrode.

[Evaluation of Characteristics]

Each test cell was charged to an SOC of 70% at a charge current of 1.2 mA/cm² and was then left at room temperature (25° C.) for 1 day (aging). Thereafter, the test cell was charged to a voltage of 4.1 V at a charge current of 1.2 mA/cm² and was further charged at 4.1 V until the charge current reached 0.06 mA/cm². After an interval, the test cell was discharged to 2.5 V at a current of 1.2 mA/cm², whereby initial charge-discharge was performed. Thereafter, the following cycle was repeated five times: a charge-discharge cycle in which the test cell was charged to a voltage of 4.1 V at a charge current of 1.2 mA/cm² and was further charged at 4.1 V until the charge current reached 0.06 mA/cm² and after an interval, the test cell was discharged to 2.5 V at a charge of 1.2 mA/cm².

In a storage test, the battery subjected to the charge-discharge cycle was charged to a voltage of 4.1 V at a charge current of 1.2 mA/cm² and was further charged at 4.1V until the charge current reached 0.06 mA/cm² followed by storing the battery for 3 days in a 60° C. thermostatic chamber.

After the stored battery was discharged to 2.5 V at a current of 1.2 mA/cm², the battery was charged to 50% of the discharge capacity obtained by performing the above charge-discharge cycle once.

A current of 0.4 mA/cm² to 56.0 mA/cm² was applied to the battery for 10 seconds and the IV resistance was calculated from the slope obtained by plotting the voltage measured after 10 seconds against each current.

Results thereof are shown in Table 1.

TABLE 1

| | Positive electrode | | | | Post-storage |
|---|---|---|---|---|---|
| Cell No. | Content of W inert material | In mix layer WO₃ | In mix layer Li₃PO₄ | Negative electrode Noncrystalline | IV resistance (mΩ) |
| A1 | 0.5% by mole | 0.5% by weight | 1% by weight | Present | −28.2 |
| B1 | 0.5% by mole | 0.5% by weight | 1% by weight | Absent | −9.9 |
| B2 | 0.5% by mole | 0.5% by weight | — | Present | 32.6 |
| B3 | 0.5% by mole | 0.5% by weight | — | Absent | −8.8 |
| A2 | 0.5% by mole | — | 1% by weight | Present | −16.0 |
| B4 | 0.5% by mole | — | 1% by weight | Absent | 22.8 |
| A3 | — | 0.5% by weight | 1% by weight | Present | −23.5 |
| B5 | — | 0.5% by weight | 1% by weight | Absent | −6.2 |
| B6 | — | 0.5% by weight | — | Present | −0.6 |
| B7 | — | 0.5% by weight | — | Absent | −5.6 |
| B8 | — | — | 1% by weight | Present | 22.7 |
| B9 | — | — | — | Present | 0 |

In Table 1, the post-storage IV resistance based on Test Cell B9 of Experiment Example 12 is shown.

As is clear from Table 1, Test Cells A1 to A3 (the positive electrodes contain tungsten, $Li_3PO_4$ is mixed, and the noncrystalline carbon material is stuck to the surface of the negative electrode active material) of Experiment Examples 1 to 3 have achieved an excellent reduction in resistance as compared to Test Cells B1 to B9 of Experiment Examples 4 to 12. This is because an appropriate amount of tungsten was dissolved from the positive electrodes and formed a good coating on the surface of the noncrystalline carbon material to reduce the reaction resistance of an active material-electrolyte solution interface.

In Test Cell B2 of Experiment Example 5 and Test Cell B6 of Experiment Example 6, since $Li_3PO_4$ was not added, the amount of dissolved tungsten was small, tungsten or a tungsten compound was not evenly dispersed on the noncrystalline carbon material, and a nonuniform coating was formed; hence, it is conceivable that a reduction in resistance could not be sufficiently achieved.

In Test Cells B1, B3 to B5, and B7 of Experiment Examples 4, 6 to 8, and 10, the post-storage IV resistance has not been reduced. This is probably because a good coating is not formed because of the absence of any noncrystalline carbon material.

Furthermore, with reference to Test Cell B8 of Experiment Example 11 and Test Cell B9 of Experiment Example 12, Test Cell B8 has an increased post-storage IV resistance. This shows that when no tungsten is present in a positive electrode, the addition of a phosphate compound causes an increase in resistance in some cases.

From the above, when tungsten and a phosphate compound are present in a positive electrode, tungsten is precipitated on a surface of a negative electrode after charge, a good coating containing tungsten or a tungsten compound is formed on the surface of a noncrystalline carbon material to reduce the reaction resistance of an active material-electrolyte solution interface, and higher output characteristics than ever before can be maintained even after storage in a charged state.

Next, Test Cell A1 of Experiment Example 1 was measured for post-storage IV resistance by varying aging conditions.

In particular, in Experiment Example 1, Test Cell A1 was aged in such a manner that Test Cell A1 was left at room temperature for 1 day as described above. In Experiment Example 13, Test Cell C1 was initially charged and discharged without aging. In Experiment Example 14, Test Cell C2 was aged in such a manner that Test Cell C2 was left at 60° C. for 1 day.

Measurement results are shown in Table 2.

by normalizing the amount of W with the amount of inert Li in each negative electrode mix.

[Measurement of Amount of W and Amount of Inert Li]

The amount of active lithium was calculated from the amount of hydrogen generated by immersing a tested negative plate in ion-exchanged water. Furthermore, a solution that was obtained in such a manner that aqua regia was added to a sample mix, was heated, and was then filtered was subjected to elemental analysis by ICP, whereby the amount of total Li contained in the mix and the amount of W contained therein were measured.

The amount of inert Li was calculated from the difference between the obtained amount of total Li and the amount of active Li and the amount of W was normalized.

As is clear from Table 2, in Test Cells A1, C1, and C2 of Experiment Examples 1, 13, and 14, that is, in the range where W amount/inert Li amount is 2.07 or less, the post-storage IV resistance is low.

This is because the presence of tungsten and a tungsten compound in a positive electrode allowed an appropriate amount of tungsten to be precipitated on a surface of a negative electrode after charge to reduce the resistance.

In the range where W amount/inert Li amount is greater than 2.07, the amount of tungsten in a coating is too large. Therefore, tungsten or the tungsten compound is unevenly present in the coating and a nonuniform coating is formed; hence, the reaction resistance increases instead.

From the above, in the range where W amount/inert Li amount is 2.07 or less, a good coating containing tungsten or a tungsten compound is formed on the surface of a noncrystalline carbon material and higher output characteristics than ever before can be maintained even after storage in a charged state.

TABLE 2

| | Positive electrode | | | | Aging conditions | | Post- | W |
| | Content | | | | | | | |
| Cell No. | of W inert material | In mix layer | | Negative electrode | Charge Capacity | Temperature/ | storage IV resistance | amount/ inert Li |
| | | $WO_3$ | $Li_3PO_4$ | Noncrystalline | (SOC) | time | (mΩ) | amount |
| A1 | 0.5% by mole | 0.5% by weight | 1% by weight | Present | 70% | 25° C./1 day | −28.2 | 1.62 |
| C1 | 0.5% by mole | 0.5% by weight | 1% by weight | Present | Not measured | Not measured | −10.3 | 2.07 |
| C2 | 0.5% by mole | 0.5% by weight | 1% by weight | Present | 70% | 60° C./1 day | −38.7 | 1.52 |
| B8 | — | — | 1% by weight | Present | 70% | 25° C./1 day | 22.7 | 0 |

In Table 2, the following values are shown: a value representing the post-storage IV resistance based on Test Cell B9 of Experiment Example 12 and a value obtained by normalizing the amount of W in each negative electrode mix with the amount of inert Li.

In association with a charge-discharge reaction, not only the dissolution of tungsten from a positive electrode but also the irreversibilization of lithium in a negative electrode active material occur. Even if the amount of irreversible Li is large, that is, a thick coating is formed on the negative electrode active material, the resistance of the coating is reduced when an appropriate amount of tungsten is contained. Therefore, the resistance of coatings was evaluated

The invention claimed is:

1. A nonaqueous electrolyte secondary battery comprising an electrode assembly having a structure in which a positive plate and a negative plate are stacked with a separator therebetween,
wherein the positive electrode plate contains a lithium transition metal oxide as a positive electrode active material, a tungsten compound and a lithium phosphate, and
the negative electrode plate contains a graphitic carbon material as a negative electrode active material, and a noncrystalline carbon material stuck on the surface of the graphite carbon material wherein the content of the lithium phosphate and the tungsten compound in the positive electrode plate is 0.01% by weight to 5% by weight with respect to the total weight of the positive electrode active material, wherein the tungsten compound is precipitated on the surface of the noncrystalline carbon material stuck on the graphite carbon material in a charged state.

2. The nonaqueous electrolyte secondary battery according to claim 1, wherein the tungsten compound is $WO_3$.

3. The nonaqueous electrolyte secondary battery according claim 1, wherein the noncrystalline carbon material is carbon black.

4. The nonaqueous electrolyte secondary battery according to claim 1, wherein the ratio of the tungsten compound on the surface of the noncrystalline carbon material stuck on the graphitic carbon material to inert lithium is between 1.52 to 2.07.

* * * * *